United States Patent [19]

Kasenga et al.

[11] Patent Number: 4,925,703

[45] Date of Patent: May 15, 1990

[54] FIRING AND MILLING METHOD FOR PRODUCING A MANGANESE ACTIVATED ZINC SILICATE PHOSPHOR

[75] Inventors: Anthony F. Kasenga, Towanda, Pa.; A. Gary Sigai, Lexington, Mass.; Thomas E. Peters, Chelmsford, Mass.; Roger B. Hunt, Medfield, Mass.

[73] Assignee: GTE Products Corporation, Stamford, Conn.

[21] Appl. No.: 288,660

[22] Filed: Dec. 22, 1988

[51] Int. Cl.$^5$ .............................................. C09K 11/59
[52] U.S. Cl. ................................. 427/215; 252/301.5; 252/301.6 F; 427/372.2
[58] Field of Search ................ 252/301.6 F, 301.5; 427/64, 67, 215, 372.2

[56] References Cited

U.S. PATENT DOCUMENTS

| | | | |
|---|---|---|---|
| 2,118,091 | 5/1938 | Leverenz | 252/301.6 F |
| 2,210,087 | 8/1940 | Leverenz | 252/301.6 F |
| 3,208,950 | 9/1965 | Yocom et al. | 252/301.6 F |
| 3,416,019 | 12/1968 | Kaduk | 252/301.6 F |
| 4,585,673 | 4/1986 | Sigai | 427/213 |
| 4,710,674 | 12/1987 | Sigai | 313/489 |
| 4,728,459 | 3/1988 | Fan et al. | 252/301.6 F |
| 4,803,400 | 2/1989 | Peters et al. | 427/215 |
| 4,825,124 | 4/1989 | Sigai | 252/301.6 F |

Primary Examiner—Jack Cooper
Attorney, Agent, or Firm—Donald R. Castle; L. Rita Quatrini

[57] ABSTRACT

A manganese activated zinc silicate phosphor and method for producing same is disclosed which comprises dry blending a mixture of components consisting essentially of zinc oxide, silicic acid, a source of manganese, ammonium chloride, ammonium fluoride, tungstic oxide and silica wherein the Zn+Mn/Si mole ratio is from about 1.95 to about 2.02, wherein the silica is colloidal and has a surface area of from about 50 to about 410 m$^2$/g, and wherein the colloidal silica makes up from about 0.01% to about 1.0% by weight, firing the blend in a nitrogen atmosphere at a temperature of from about 1200° C. to about 1300° C. for a sufficient time to produce the phosphor, and firing the phosphor in air at a temperature of from about 1175° C. to about 1275° C. for a sufficient time to diffuse the tungsten and manganese to the surfaces of the phosphor particles. Between the firing steps, the phosphor can be milled for from about 60 to 120 minutes to increase luminescence. The phosphor can be coated with a continuous coating of aluminum oxide and annealed to improve maintenance of the phosphor. A fluorescent lamp incorporating the phosphor is also disclosed.

14 Claims, 1 Drawing Sheet

FIRING AND MILLING METHOD FOR PRODUCING A MANGANESE ACTIVATED ZINC SILICATE PHOSPHOR

This invention is related to application Ser. No. 288,659 entitled "Method For Producing Manganese Activated Zinc Silicate Phosphor," filed concurrently herewith.

This invention relates to a method for producing a manganese activated zinc silicate phosphor wherein a source of colloidal silica of high surface area is blended with the starting components from which the phosphor is made. This results in reproducible production of high quality phosphor brightness. Moreover, blending time is reduced and there is greater flexibility in the Zn +Mn/Si mole ratio that can be used. This allows for more flexibility in formulation and blending and better reproducibility in manufacturing the phosphor. The phosphor can be refired or milled and refired this results in further increase in luminescence. The phosphor can be coated or coated and annealed to improve maintenance or life of the phosphor when it is used in lamps.

BACKGROUND OF THE INVENTION

In the production of manganese activated zinc silicate phosphors, excess silicic acid with long blending times are used with fluxes and long firing times in order to achieve a good reaction. This phosphor requires a high manganese concentration that is necessary for high luminescence efficiency and it is difficult to achieve a good blend especially with the zinc component. Sometimes this phosphor manufactured by these method results in a brown or yellow discoloration and very poor fluorescent lamps. This is due possibly to minute traces of unincorporated manganese with the zinc component.

Manganese activated zinc silicate phosphors are disclosed in U.S. Pat. Nos. 2,109,984, 2,206,280, 2,210,087, 2,222,509, 2,241,030, 2,245,414, 2,247,142, 2,544,999, and 3,416,019.

Another problem with manganese activated zinc silicate phosphors is the relatively poor fluorescent lamp maintenance. That is, the light output or lumens per watt of the phosphor decreases to a greater extent during lamp life than is desirable. This invention is concerned with a manganese activated zinc silicate phosphor having improved maintenance.

SUMMARY OF THE INVENTION

In accordance with one aspect of the invention, there is provided a manganese activated zinc silicate phosphor and method for producing same which comprises dry blending a mixture of components consisting essentially of zinc oxide, silicic acid, a source of manganese, ammonium chloride, ammonium fluoride, tungstic oxide and silica wherein the Zn +Mn/Si mole ratio is from about 1.95 to about 2.02, wherein the silica is colloidal and has a surface area of from about 50 to about 410 $m^2/g$, and wherein the colloidal silica makes up from about 0.01% to about 1.0% by weight, firing the blend in a nitrogen atmosphere at a temperature of form about 1200° C. to about 1300° C. for a sufficient time to produce the phosphor, and firing the phosphor in air at a temperature of from about 1175° C. to about 1275° C. for a sufficient time to diffuse the tungsten and manganese to the surfaces of the phosphor particles. Between the firing steps, the phosphor can be milled for from about 60 to 120 minutes to increase luminescence. The phosphor can be coated with a continuous coating of aluminum oxide to improve maintenance of the phosphor.

In accordance with another aspect of the invention, there is provided a fluorescent lamp incorporating the phosphor.

DETAILED DESCRIPTION OF THE INVENTION

Figure 1:
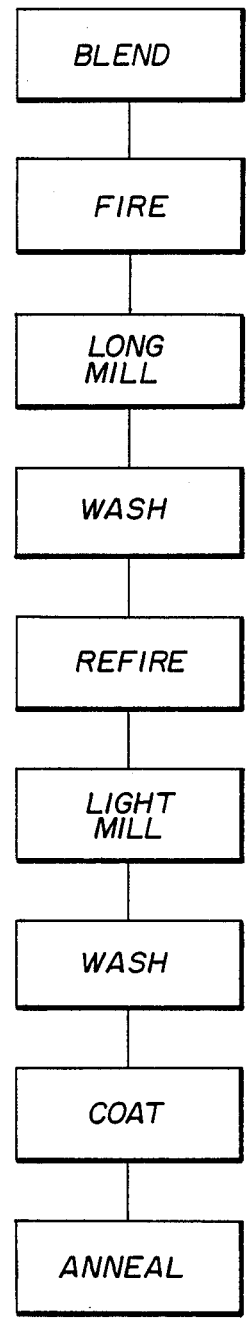
FIG. 1 is a schematic diagram of the steps of a preferred method of practicing the present invention.

For a better understanding of the present invention, together with other and further objects, advantages and capabilities thereof, reference is made to the following disclosure and appended claims in connection with the above described drawing and description of some of the aspects of the invention.

The phosphor produced by the process of this invention is manganese activated zinc silicate having the formula $Zn_2SiO_4$:Mn.

The first step in making the phosphor is to dry blend a mixture of the starting components which will be subsequently fired to produce the phosphor. The starting components are zinc oxide, silicic acid, a source of manganese, preferably manganese carbonate, and fluxes such as ammonium chloride, ammonium fluoride and tungstic oxide. Tungstic oxide improves the maintenance of the phosphor as described in U.S. Pat. No. 4,728,450. A typical composition of this mixture is given in the example that ensues. The mole ratio of Zn +Mn/Si is from about 1.95 to about 2.02. In addition to the above components, a source of colloidal silica is added to make the mixture. The content of this silica in the mixture ranges from about 0.1% to about 1.0% by weight and preferably from about 0.03% to about 0.3% by weight. This range of silica content allows the resulting phosphor to have reproducible brightness when tested in fluorescent lamps. The silica is colloidal and characterized by a high surface area. The surface area is from about 50 to about 410 $m^2$ per gram, preferably from about 100 to about 300 $m^2$ per gram and most preferably from about 175 to about 225 $m^2$ per gram. A preferred source of this type of silica is manufactured by Degussa, Inc. New York, N.Y. under the trade name of "Aerosil". According to a technical bulletin by Degussa, Aerosil ® is a colloidal silica manufactured by a flame hydrolysis of silicon tetrachloride in the gas phase. Aerosil ® is supplied in various surface areas as designated by the number after the name. Especially suited to the purposes of the present invention is Aerosil ® which has a high surface area of about 200±25 $m^2/g$ with a primary particle size of about 12 millimicrons. This is a very pure silica which has unusual electrical and optical properties.

The resulting blended mixture is then fired in nitrogen at a temperature of from about 1200° C. to about 1300° C. and preferably at about 1250° C. for a sufficient time preferably about 2.5 hours to produce the phosphor.

The resulting phosphor can be broken up or crushed into smaller pieces or particles at this point.

The resulting phosphor is then fired in air at a temperature of from about 1175° C. to about 1275° C. for a sufficient time to diffuse the tungsten and manganese to the surfaces of the phosphor particles. This step is referred to as the "refiring" step.

The phosphor is preferably subjected to light milling to clean the surfaces of the phosphor particles and to remove any surface manganese which is present. By light milling is meant that the duration of milling time is relatively short, that is, the duration is typically from about 20 to about 30 minutes. The milling is done preferably with citric acid in water. The milled material is washed with water, filtered, dried, and classified such as by sieving to obtain the desired particle size for use in the application. One or more of this series of steps of milling, washing, and classifying is called finishing the phosphor in preparation for its use in the application. The milling is done according to methods well known in the art.

The addition of colloidal silica to the formulation blend as described above achieves a more intimate blend and results in reproducible and high quality phosphor lots when evaluated in a fluorescent lamp. Table 1 exhibits lamp data on nine lots made with 0.1% by weight colloidal silica in the mixture. The data is obtained on material in which the blended mixture is fired followed by the light milling step. The second firing of the phosphor or refiring step is not done. Over about 5,000 lumens at zero hours are achieved in six of the eight lots (1-1, 1-4, 1-5, 1-6, 1-7, and 1-8) with the remaining three lots achieving over about 4900 lumens at zero hours (1-2, 1-3, and 1-9). Table 1 also demonstrates that this high luminosity is achieved at lower $NH_4F$ concentrations ($\frac{1}{4}$, $\frac{1}{2}$), by drum blending half the normal time (DB, 8 hr) or by V-blending (a preferred blending technique). These results are contrasted with previous lots as listed on Table 2 that are formulated without colloidal silica. Again the data is obtained on material in which the blended mixture is fired followed by light milling. The refiring step is not done. These lots are inferior when evaluated in a fluorescent lamp and occasionally result in a brown fired cake. V-blending does not result in high luminosity phosphors as exhibited in lots 2-3 and 2-14, although this is normally a preferred blending technique.

TABLE 1

Phosphor Formulated with 0.1% by Weight Colloidal Silica

| # | Formulation NH$_4$F | NH$_4$Cl | Blending Type | Firing Time | Temp. | Powder wt | Lamp Data Lumens |
|---|---|---|---|---|---|---|---|
| 1-1 | Std | Std | DB | 16 hr 7 min | Std | 7.7 | 5023 |
| 1-2 | ½* | Std | DB | 8 hr 8 min | Std | 8.2 | 4932 |
| 1-3 | ¼ | Std | DB | 8 hr 8 min | Std | 6.4 | 4978 |
| 1-4 | Std | Std | DB | 8 hr 8 min | Std | 7.6 | 5115 |
| 1-5 | Std | Std | DB | 8 hr 8 min | Std | 8.1 | 5109 |
| 1-6 | Std | Std | VB | 1 hr 8 min | Std | 6.1 | 5070 |
| 1-7 | ¼** | 2.12 ×*** | DB | 8 hr 8 min | Std | 8.9 | 5111 |
| 1-8 | ¼ | Std | VB | 1 ¼ hr 8 min | Std | 6.4 | 5073 |
| 1-9 | ½ | Std | VB | 1 ¼ hr 8 min | Std | 6.4 | 4906 |

Std - Standard concentration
DB - Drum blending
VB - V-Blending
*½ of Std
**¼ of Std
***2.12 × Std

TABLE 2

Phosphor Formulated Without Colloidal Silica

| Lot | Formulation NH$_4$F | NH$_4$Cl | Blending Type | Firing Time | Temp. | Powder wt | Lamp Data Lumens |
|---|---|---|---|---|---|---|---|
| 2-1 | Std | Std | DB | 16 hr 7 min | Std | — | 4326 |
| 2-2 | Std | Std | DB | 16 hr 7 min | Std | — | 4699 |
| 2-3 | Std | Std | VB | 1 hr 7 min | Std | — | 4419 |
| 2-4 | Std | Std | DB | 16 hr 7 min | Std | — | 4664 |
| 2-5 | Std | Std | DB | 16 hr 7 min | Std | 8.3 | 4820 |
| 2-6 | Std | Std | DB | 16 hr 7 min | Std | 9.7 | 4739 |
| 2-7 | Std | Std | DB | 16 hr 7 min | Std | 10.6 | 4512 |
| 2-8 | Std | Std | DB | 16 hr 7 min | Std | 10.6 | 4512 |
| 2-9 | Std | Std | DB | 16 hr 7 min | Std | 10.3 | 4565 |
| 2-10 | Std | Std | DB | 16 hr 7 min | Std | 11.5 | 4782 |
| 2-11 | Std | Std | DB | 16 hr 7 min | Std | 11.7 | 4666 |
| 2-12 | Std | Std | DB | 16 hr 7 min | Std | 12.0 | 4805 |
| 2-13 | Std | Std | DB | 16 hr 7 min | Std | 11.9 | 4719 |
| 2-14 | Std | Std | VB | 1 hr 7 min | Std | 13.3 | 4826 |
| 2-15 | Std | Std | DB | 16 hr 7 min | Std | 10.1 | 4836 |

To demonstrate that the addition of colloidal silica improves the intimacy of the blend a test of reduced blending time is completed using a drum blender. The blending time is reduced from the typical 16 hours to about 4 hours when the colloidal silica is used according to the present invention.

Table 3 below shows the length of drum blending time with addition of Aerosil$^R$ on lamp performance. The data is obtained on material in which the dry blended mixture is fired followed by light milling. The refiring is not done.

TABLE 3

| Sample | Blending Time (HR) | Powder weight | 0 Hr. Lamp Output Lumens | Comments |
|---|---|---|---|---|
| 3-1 | 4 | 6.5 | 5071 | |
| 3-2 | 8 | 7.1 | 5015 | |
| 3-3 | 10 | 7.4 | 5042 | |
| 3-4 | 12 | 7.0 | 5065 | |
| 3-5 | 14 | 6.6 | 5043 | |
| 3-6 | 16 | 7.2 | 4928 | Normal blending time Control |

TABLE 3-continued

| Sample | Blending Time (HR) | Powder weight | 0 Hr. Lamp Output Lumens | Comments |
| --- | --- | --- | --- | --- |
| 3-7 | — | 4.9 | 4367 | Commercial phosphor-lamp control |

It can be seen that when Aerosil ® is used reproducible brightness of over about 5000 lumens is attained with less blending time (a decrease from about 16 hours to about 4 hours). As previously demonstrated in Table 2, without Aerosil ® a 16 hour blending time does not reproducibly achieve a high lumen quality.

The incorporation of the colloidal silica into the initial mixture of components results in greater flexibility of the mole ratio of Zn +Mn/Si than when this silica is not used.

Prior to the present invention, the mole ratio of Zn +Mn/Si is limited to 1.97 to achieve a high degree of reactivity and good quality brightness in a lamp. With the addition of colloidal silica according to the present invention greater latitude in the mole ratio is possible. For example, with colloidal silica, a mole ratio of Zn +Mn/Si of >2 such as 2.02, a brightness of >5000 lumens at zero hours is achieved when the phosphor is tested in a lamp. The brightness is high also at lower mole ratios of Zn +Mn/Si of, for example, 1.99, 1.98, and 1.95.

It is believed that the advantage of the incorporation of the colloidal silica into the mixture is that the reaction of the zinc with the manganese and the silicon is more complete as opposed to incompleteness when the colloidal silica is not used. This incomplete reaction is indicated by a brownish color in the fired material or poor luminosity in fluorescent lamps. The brown material contains unreacted zinc oxide with manganese present.

Once the manganese activated zinc silicate phosphor is made as described above, that is, by blending the components, firing and refiring, with the optional light milling, water washing, filtering and drying steps, the phosphor particles can be coated with a continuous coating of aluminum oxide and annealed. This coated and annealed phosphor exhibits increased maintenance or longer life compared to phosphors produced which are not alumina coated and annealed.

The advantages associated with the phosphor of the present invention are illustrated by the lamp performance of the phosphor when particles are individually coated with a continuous protective coating. Individually and continuously coated phosphor particles are prepared by depositing a continuous, nonparticulate, conformal, aluminum oxide coating on the outer surfaces of the individual phosphor particles. Such coating can be applied by coating methods such as, for example, chemical vapor deposition or preferably chemical vapor deposition in a fluidized bed.

The coated phosphor particles are annealed in an air atmosphere at a temperature of from about 700° C. to about 850° C. for a period of from about 15 minutes to about 20 hours.

Between the firing and refiring steps, the phosphor can be milled usually at room temperature for a period of time of from about 60 minutes to about 120 minutes and preferably for about 90 minutes. This milling step is called long-milling to distinguish it over the previously described light milling step. Normally, the long and light milling procedure are the same except for the milling times. The milling is done by methods well known in the art. The milling is done in citric acid. Prior to the refiring step, the long-milled phosphor is normally washed, filtered, dried and classified.

The long-milled and refired phosphor can then be light milled, washed, filtered, dried, and classified (finished) as described previously. FIG. 1 is a schematic diagram of the preferred steps of the process of the present invention that includes the firing step, the long milling step, the refiring step, the finishing steps (light milling and washing) and finally the coating and annealing steps.

The long-milled and refired phosphor can be coated or coated and annealed as described previously.

In accordance with one embodiment of this invention, there is provided a fluorescent lamp comprising a light transmitting sealed glass envelope of circular cross section containing electrodes at each end supported by lead-in wires which extend through glass presses in mount stems to the contacts in bases which are affixed to the ends of the lamp. The envelope is filled with an inert gas such as argon and neon at a lower pressure, for example, two torr, and a small quantity of mercury, at least enough to provide a low vapor pressure of about six microns during operation. The interior of the envelope is coated with at least one layer of a blend of phosphors. The blend comprises at least one phosphor of the present invention.

A phosphor coating suspension is prepared by dispersing the phosphor particles in a water base system employing polyethylene oxide as the binder with water as the solvent. The phosphor suspension is applied in the usual manner of causing the suspension to flow down the inner surface of the envelope and allowing the water to evaporate, leaving the binder and phosphor particles adhered to the envelope wall. The phosphor coated envelope is then heated in a lehr to volatilize the organic components, the phosphor layer remaining on the envelope wall.

The envelope is processed into a fluorescent lamp by conventional lamp manufacturing techniques.

To more fully illustrate this invention, the following nonlimiting example is presented.

EXAMPLE 1

The following blend is made up:

| | Mole ratio | Amount (kg) |
| --- | --- | --- |
| ZnO | 2.00 | 282.0 |
| Silicic acid | 1.077 | 127.152 |
| Aerosil 200 | 0.0043 | 0.448 |
| MnCO$_3$ | 0.1217 | 26.222 |
| | Total | 435.822 |

The above materials except for the ZnO are put into a 40 cubic foot V-blender with an intensifing bar and blended for about 20 minutes. The ZnO is added to this same V-blender and then blended for about 20 minutes followed by intensifying with blending for about 20 minutes. (This is blend #1) To an 8 quart V-blender with an intensifying bar is added about 2.5 kg of the above blend and the fluxes (blend #2) given below. The resulting new blend with the fluxes is blended with intensifying bar for about 30 minutes.

|  | Mole ratio | Amount (g) |
| --- | --- | --- |
| NH₄Cl | 0.0465 | 383.0 |
| NH₄F | 0.0040 | 22.8 |
| WO₃ | 0.00116 | 41.4 |

About 36.237 kg of blend #1 is added to a 5 cubic foot V-blender with an intensifying bar and blended for about 10 minutes. To this blended mixture is added blend #2 and the resulting new blend is blended for about 15 minutes and blended and intensified for another 60 minutes. This results in a blend with a formulation as given below.

|  | Mole ratio |
| --- | --- |
| ZnO | 2.00 |
| Silicic acid | 1.077 |
| Aerosil 200 | 0.0043 |
| MnCO₃ | 0.1217 |
| NH₄Cl | 0.0465 |
| NH₄F | 0.0040 |
| WO₃ | 0.00116 |

This formulation is fired in a continuously stoked furnace at about 1250° C., stoked at about 8 minutes per crucible, and purged with nitrogen. The crucibles are alumina with covers that each contain about 500 g of this formulation. The resulting phosphor cakes are skinned to remove any dull luminescence material. The material at this stage is called the fired cake (FC).

This fired cake is finished by the following procedure. A 12 gallon ball mill is filled with from about 8 to about 12 kg of the fired cake, about 14 liters of deionized water, and about 4 g of citric acid per kg of fired cake. This mill contains also 94 lb. of ⅜" alumina balls and is rotated at about 27 RPM for about 20 minutes to light-mill the phosphor. The light-milled phosphor is transferred to a 50 gallon tank and washed six times for 10 minutes with settling times of 3.0, 2.0, 1.5, 1.0, 0.5 hours respectively. This material is filtered and oven dried at about 230° C. for about 16 hours. Finally the material is sieved through a 400 mesh screen.

EXAMPLE 2

In order to make refired material, The above fired cake (FC) is then fired again at about 1225° C., stoked at from about 8 to about 12 minutes/crucible, open to air, silica crucibles without covers are used in this firing with about 500 g of the FC material/crucible. The material is skimmed of dull luminescent material and is called the refired cake RFC at this stage. This material is finished as in Example 1.

EXAMPLE 3

In order to make milled and refired material the above material from Example 1 is first long-milled. This is done in the same way as the finishing step except that the milling time is increased to about 90 minutes. The material is then washed, filtered and dried the same as in the finishing step but is not sieved. The long-milled phosphor is then refired as previously described. This material is then finished as described previously.

The phosphors of Examples 1, 2, and 3 are coated and annealed as follows:

Approximately 1500 gms of phosphor with approximately 0.05–0.1% by weight of a fluidization aid such as Aluminum Oxide C, available from Degussa, Inc., is loaded into a fluid bed column comprising a 80 millimeter ID quartz tube having a quartz frit fused to the bottom acting as a distributor plate. A 65 millimeter stainless steel agitator disc is positioned inside the quartz tube. The agitator disc is attached to a vibromixer agitator. Approximately 50 millimeters from the base of the agitator a two micron stainless steel filter element is welded in line and functions as the diffuser of the oxygen mixture. The agitator disc itself is located approximately 25 millimeters above the quartz distributor. A series of approximately eleven copper coil windings of ¼" tubing are located immediately around the frit located at the bottom of the quartz tube such that one coil is below the distributor and the remaining ten coils are above the distributor plate. In addition, there is a copper foil of approximately 120 millimeters which is sandwiched between the cooling coil and the quartz tube to provide improved heat transfer and there is insulation located above the copper coil windings to further reduce heat transfer between the heated and the unheated portions of the tube. This insulation comprises approximately 50 millimeters and 1" wide by ½" thick Fiberfax roll insulation. The edge of the Fiberfax insulation matches exactly the level between the unheated and heated part of the 3-Zone Lindberg furnace, that is, between the bottom and center zones of the furnace. The furnace zones are 6", 12", and 6" in length, and a spike thermocouple is located at the midpoint of each zone. The first two furnace zones are set for 500° C. and the last zone is shut off. The amount of phosphor charged into the column is 1500 gms, and the height of the phosphor bed is approximately 500 mm. The operating conditions for the fluid bed CVD alumina coating of the phosphors are shown in Table I. The fluid bed temperature is recorded by a thermocouple located within the fluid bed half way between the distributor plate and the top of the expanded bed. A second thermocouple is located between the agitator and distributor. The temperatures quoted in Table I are the minimum and maximum temperatures measured during the actual coating operation. The gasses that pass through the distributor plate at the bottom of the quartz column have flow rates as shown in Table I. For the bubbler, 1500 cc/min. of an inert gas such as nitrogen, argon, helium, neon, or mixtures thereof and for the carrier, 1800 cc/min. of the inert gas. A fluidized phosphor bed is formed by passing the inert gas upwardly through the phosphor particles in order to suspend the particles in the inert gas stream. In addition to supporting the phosphor particles in a fluidized bed, the inert gas functions as a carrier gas for the vaporized trimethyl aluminum. The inert gas is passed through the bubbler containing liquid trimethyl aluminum at approximately 30° C. and the liquid trimethyl aluminum is vaporized into the inert gas before passing through the distributor plate into the fluidized phosphor bed. A continuous protective alumina coating is formed on the surface of the individual phosphor particles when the vaporized trimethyl aluminum is exposed to the oxygen at a temperature sufficient for a reaction between the oxygen and the vaporized trimethyl aluminum to occur. The oxygen as an oxygen-/inert gas mixture is introduced at 2500 cc/min. for O₃ and 50 cc/min. for N₂ into the fluidized bed through the two micron filter elements located on the shaft of the vibrating mixer above the vibrating disc. The coating times are shown in Table I. Once the particles of the phosphor are coated with a continuous coating of alumina, the alumina coated phosphor powder is transferred into a quartz boat of dimensions 2¼" (height)×4" (width)×10" (length). Typical powder loading is 750 gms. The boat is inserted into a six-inch diameter MAXIBRUTE™ tube furnace which is purged with 1½ liters per minute of air. The furnace is then brought up to the annealing temperature from room temperature in about an hour. The annealing temperature, as measured by a calibrated thermocouple imbedded in the powder is 765° C. The powder remains at temperature for 4 hours and then is allowed to cool overnight. After the annealing step, the phosphor is coated in 20W-T12 or 40W-T12 lamps using a conventional water base suspension system. The coated lamps are then processed into finished lamps and evaluated.

Tables II, III, and IV show data on fluorescent lamps in which the phosphors are prepared according to the general procedures described in Examples 1, 2, and 3 compared to a control Type 2293 (Ce,Tb) $MgAl_{11}O_{19}$ phosphor.

TABLE I
FLUID BED COATING PARAMETERS

| Sample | Alon C* wt. % | Temperature** °C. Below Agitator Agitator | Mid Bed | Coating Time |
|---|---|---|---|---|
| Example 1 | 0.1 | 401/420 | 410/434 | 4 hr |
| Example 2 | 0.1 | 392/450 | 415/446 | 3 hr 45 min. |
| Example 3 Lot #1 | 0.1 | 400/418 | 410/442 | 3 hr 30 min. |
| Example 3 Lot #2 | 0.05 | 320/410 | 378/448 | 4 hr 7 min. |
| Example 3 Lot #3 | 0.05 | 359/448 | 392/449 | 4 hr 7 min. |

*Aluminum Oxide C
**Temperatures quoted are the minimum and maximum temperatures measured during the actual coating operation.
Charge - 1500 gms
Flow rates:
Bubbler - 1500 cc/min.
Carrier for bubbler - 1800 cc/min.
Oxygen - 2500 cc/min.
Carrier for oxygen - 50 cc/min.

TABLE II

| Example # | Density g/cc | Powder Weight | 0 Hr. Lumens | 100 Hr. Lumens | % M 0-100 Hr. | 500 Hr. Lumens | % M 100-500 Hr. | 1000 hr Lumens | % M 100-1000-Hr. |
|---|---|---|---|---|---|---|---|---|---|
| | | | SET I (40WT12) | | | | | | |
| Control | 78.5 | 6.37 | 4913 | 4773 | 97.2 | 4704 | 98.6 | 4689 | 98.2 |
| 1 without refiring | 76.3 | 8.53 | 4678 | 4490 | 96.0 | 4388 | 97.7 | 4332 | 96.5 |
| 2 RF | 76.1 | 8.44 | 4806 | 4601 | 95.7 | 4480 | 97.4 | 4401 | 95.7 |
| 3 MF | 76.9 | 8.17 | 4938 | 4698 | 95.1 | 4598 | 97.9 | 4615 | 98.2 |
| | | | SET II | | | | | | |
| Control | 78.5 | 2.97 | 2008 | 1919 | 95.6 | 18.72 | 97.6 | 1854 | 96.6 |
| 3 MF | 77.5 | 4.25 | 2049 | 1926 | 94.0 | 1841 | 95.6 | 1819 | 94.4 |
| 3 MF | 77.5 | 4.05 | 2026 | 1929 | 95.2 | 1852 | 96.0 | 1835 | 95.1 |

Control - (Ce,Tb)$MgAl_{11}O_{19}$
RF - refired phosphor
MF - long-milled and refired phosphor Table II contrasts the three procedures of "without refiring," (Example 1), "refiring," (Example 2) and "milling and refiring" (Example 3). This table details fluorescent lamp data on the alumina coated and annealed $Zn_2SiO_4$:Mn phosphor after applying the coating. From this data it can be seen that the refired phosphor RF and the long-milled and refired phosphor MF processes exhibit superior luminosity at 0 hr. and 100 hr and through to 1,000 hr of lamp operation compared to the material which is not refired. The processes of Examples 2 and 3 exhibit a lower powder weight and better lamp texture. The long-milled and refired phosphor results in the highest lumen output at the lowest powder weight. These processes appear to be reproducible as exhibited in the samples in SET II. It should be noted also that the high 100 Hr. lumen and maintenance levels obtained with refired and long-milled and refired phosphors are comparable to the (Ce, Tb) $MgAl_{11}O_{19}$ phosphor which serves as the control.

The phosphor characteristics before the coating is applied are shown in Table III for these same samples lots. Table III details powder data for particle size and chemical composition. From this data it can be seen that the refired and long-milled and refired phosphors of Examples 2 and 3 respectively both exhibit good brightness. These processes appear to narrow the particle size distribution (lower QD as measured by Coulter Counter technique) especially by lowering the coarse fraction (higher NS). The particle size appears to be slightly reduced as measured by Coulter Counter or BET (higher surface area) measurements. These processes result in reduction of the bulk tungsten level from about 610 to about 520 or 290 weight ppm respectively. Finally, the 0 Hr. output in a fluorescent lamp appears to be slightly improved even though uncoated for Set I. The remilled and refired phosphor results in improvement in all these results compared to the refired phosphor. These processes appear to be reproducible in all the powder and fluorescent lamp characteristics as exhibited on the samples of SET II.

TABLE III

| # | BET SA | Particle size (μm) Coulter Counter 50% Sonic | QD | NS | Bulk W (ppm) | Lamp data Lumens 0 Hr. | 100 Hr. |
|---|---|---|---|---|---|---|---|
| | | SET I | | | | | |
| Example 1 without refiring | .21 | 11.0 | 0.33 | 2.5 | 610 | 4940 | 80.0 |
| Example 2 RF | .23 | 11.2 | 0.32 | 3.5 | 520 | 4943 | 80.7 |
| Example 3 MF Lot #1 | .29 | 9.6 | 0.25 | 4.0 | 290 | 5009 | 74.9 |
| | | SET II | | | | | |
| Example 3 MF Lot #2 | .26 | 9.5 | 0.25 | 4.0 | 250 | 4699 | 70.6 |
| Example 3 MF | .23 | 9.4 | 0.24 | 4.0 | 170 | 4952 | 80.1 |

TABLE III-continued

| # | BET SA | Particle size (μm) Coulter Counter 50% Sonic | QD | NS | Bulk W (ppm) | Lamp data Lumens 0 Hr. | 100 Hr. |
|---|---|---|---|---|---|---|---|
| Lot #3 | | | | | | | |

Tungsten is purposely added to the phosphors of Examples 1, 2, and 3 in the initial blending step mainly to improve particle growth and to improve fluorescent lamp maintenance as taught in U.S. Pat. No. 4,728,459. Too high a tungsten level results in an undesirable product after coating. This tungsten level is significantly reduced by the long-milling and refiring process and slightly by the refiring process. These results can be seen in Table IV. To further explore this point, Table IV exhibits chemical analysis by bulk (atomic absorption) and surface (ESCA) of $Zn_2SiO_4$:Mn phosphors. Table IV includes samples of materials during various stages of the processes and finished phosphors. Theoretical atomic percentages are also included that are based on actual formulation for the particular lots. A brief description of the relationships of these samples to the processes is given below.

IV-1 no refiring or long-milling (as in Example 1) without finishing.

IV-2 no refiring or long-milling (as in Example 1) with finishing.

IV-3 refired (as in Example 2) without finishing.

IV-4 (refiring (as in Example 2) with finishing.

IV-5 long-milled and finished but without classifying.

IV-6 long-milled and refired (as in Example 3) without finishing.

IV-7 long-milled and refired (as in Example 3) with finishing

TABLE IV

| | Atomic Percent | | | |
|---|---|---|---|---|
| | Bulk (Atomic Absorption) | | Surface ESCA | |
| # | Mn | W | Mn | W |
| Theoretical | 1.625 | 0.0155 | 1.625 | 0.0155 |
| IV-1 | 1.81 | 0.0130 | 4.0 | 2.1 |
| IV-2 | 1.78 | 0.0105 | 1.3 | 0.14 |
| IV-3 | 1.75 | 0.0113 | 3.9 | 2.0 |
| IV-4 | 1.75 | 0.0088 | 1.3 | 0 |
| IV-5 | 1.75 | 0.0101 | 0.95 | 0 |
| IV-6 | 1.78 | 0.0103 | 4.7 | 2.5 |
| IV-7 | 1.67 | 0.0048 | 1.0 | 0.06 |

From the data in Table IV it appears that the surface tungsten and manganese level is increased on fired materials (IV-1, IV-3, and IV-6) and that finishing reduces or eliminates these surface concentrations. This results in reduced bulk levels especially in the tungsten as exhibited in Tables III and IV. Thus the MF and to a lesser extent the refiring procedure allows for the bulk tungsten to be reduced in the finished phosphor so that its detrimental effect on the overall product is not observed and to utilize its particle growth and maintenance benefits.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing manganese activated zinc silicate phosphor, particles said method comprising:
   (a) dry blending a mixture of components consisting essentially of zinc oxide, silicic acid, a source of manganese, ammonium chloride, ammonium fluoride, tungstic oxide in amount sufficient to improve phosphor maintenance in a fluorescent lamp, and silica, and having a Zn +Mn /Si mole ratio of from about 1.95 to about 2.02, wherein said silica is colloidal and has a surface area of from about 50 to about 410 $m^2$ per gram, and wherein said colloidal silica makes up from about 0.01% to about 1.0% by weight of said mixture;
   (b) firing the resulting dry blend of components in a nitrogen atmosphere at a temperature of from about 1200° C. to about 1300° C. for a sufficient time to produce said phosphor particles; and
   (c) firing said phosphor particles in air at a temperature of from about 1175° C. to about 1275° C. for a sufficient time to diffuse the tungsten and manganese to the surfaces of the phosphor particles.

2. A method according to claim 1 wherein said Zn +Mn / Si mole ratio is from about 1.97 to about 1.99.

3. A method according to claim 1 wherein said colloidal silica makes up from about 0.03% to about 0.3% by weight of said mixture.

4. A method according to claim 1 wherein the surface area of said colloidal silica is from about 100 to about 300 $m^2$ per gram.

5. A method according to claim 4 wherein said surface area is from about 175 to about 225 $m^2$ per gram.

6. A method according to claim 1 comprising the additional step of coating the fired phosphor particles of step (c) with a continuous coating of aluminum oxide to form manganese activated zinc silicate phosphor particles having a continuous coating of aluminum oxide thereon, said coated phosphor particles having improved maintenance over said phosphor particles produced absent said coating.

7. A method according to claim 6 wherein said coated phosphor particles are annealed in an air atmosphere at a temperature of from about 700° C. to about 850° C. for a period of time of from about 15 minutes to about 20 hours.

8. A method for producing manganese activated zinc silicate phosphor , particles said method comprising:
   (a) dry blending a mixture of components consisting essentially of zinc oxide, silicic acid, a source of manganese, ammonium chloride, ammonium fluoride, tungstic oxide in an amount sufficient to improve phosphor maintenance in a fluorescent lamp, and silica, and having a Zn +Mn /Si mole ratio of from about 1.95 to about 2.02, wherein said silica is colloidal and has a surface area of from about 50 to about 410 $m^2$ per gram, and wherein said colloidal silica makes up from about 0.1% to about 1.0% by weight of said mixture;
   (b) firing the resulting dry blend of components in a nitrogen atmosphere at a temperature of from about 1200° C. to about 1300° C. for a sufficient time to produce said phosphor particles;
   (c) milling the resulting phosphor particles for a period of time of from about 60 minutes to about 120 minutes; and
   (d) firing the resulting milled phosphor particles in air at a temperature of from bout 1175° C. to about 1275° C. for a sufficient time to diffuse the tungsten and manganese to the surfaces of the phosphor particles.

9. A method according to claim 8 wherein said Zn+Mn / Si mole ratio is from about 1.97 to about 1.99.

10. A method according to claim 8 wherein said colloidal silica makes up from about 0.03% to about 0.3% by weight of said mixture.

11. A method according to claim 8 wherein the surface area of said colloidal silica is from about 100 to about 300 m² per gram.

12. A method according to claim 11 wherein said surface area is from about 175 to about 225 m² per gram.

13. A method according to claim 8 comprising the additional step of coating the fired phosphor particles of step (d) with a continuous coating of aluminum oxide to form manganese activated zinc silicate phosphor particles having a continuous coating of aluminum oxide thereon, said coated phosphor particles having improved maintenance over said phosphor particles produced absent said coating.

14. A method according to claim 13 wherein said coated phosphor particles are annealed in an air temperature at a temperature of from about 700° C. to about 850° C. for a period of time of from about 15 minutes to about 20 hours.

* * * * *

UNITED STATES PATENT AND TRADEMARK OFFICE
CERTIFICATE OF CORRECTION

PATENT NO. : 4,925,703

DATED : May 15, 1990

INVENTOR(S) : Anthony F. Kasenga et al

It is certified that error appears in the above-identified patent and that said Letters Patent is hereby corrected as shown below:

ON TITLE PAGE:
    At line [73] Assignee: reads GTE Products Corporation,
    Col. 1, page 1                Stamford, Conn.

At line [73[ Assignee: Should read
    Col. 1, page 1                GTE Products Corporation, and
                                        GTE Laboratories Inc.
                                        Stamford, CONN.

Signed and Sealed this

Fifth Day of May, 1992

Attest:

DOUGLAS B. COMER

*Attesting Officer*          *Acting Commissioner of Patents and Trademarks*